United States Patent [19]

Hirai et al.

[11] Patent Number: 5,046,185
[45] Date of Patent: Sep. 3, 1991

[54] REGENERATIVE REPEATER

[75] Inventors: Masato Hirai; Yoshinori Bekki; Sinzi Ikezawa; Teruo Moriguchi, all of Hadano, Japan

[73] Assignees: Hitachi, Ltd., Chiyoda; Hitachi Computer Electronic Co., Ltd., Hadano, both of Japan

[21] Appl. No.: 386,482

[22] Filed: Jul. 28, 1989

[30] Foreign Application Priority Data

Sep. 3, 1988 [JP] Japan .................. 63-220672

[51] Int. Cl.⁵ .......................... H04L 25/60
[52] U.S. Cl. .......................... 375/4; 370/15; 370/85.12
[58] Field of Search ............ 375/3, 3.1, 4; 370/15, 370/16, 16.1, 85.9, 85.12; 340/825.05, 825.5; 178/70 R, 70 A; 379/4, 5, 29

[56] References Cited

U.S. PATENT DOCUMENTS

| 4,551,830 | 11/1985 | Huffman | 370/15 |
| 4,553,233 | 11/1985 | Debuysscher et al. | 370/16.1 |
| 4,685,102 | 8/1987 | Lewis | 370/15 |
| 4,745,597 | 5/1988 | Morgan et al. | 370/85.9 |
| 4,769,807 | 9/1988 | Niwa et al. | 370/16 |
| 4,815,069 | 3/1989 | Nakayashiki et al. | 370/15 |
| 4,887,256 | 12/1989 | Nakayashiki et al. | 370/15 |

FOREIGN PATENT DOCUMENTS 56-89156 3/1981 Japan .

Primary Examiner—Stephen Chin
Attorney, Agent, or Firm—Pennie & Edmonds

[57] ABSTRACT

A regenerative repeater for regeneratively repeating a signal to be transmitted is inserted in two ring-like transmission lines, and is provided with loop back means for automatically separating the regenerative repeater from the ring-like transmission lines in the condition that a power supply is in a not-yet-turned-on state, so that closed ring-like transmission lines are formed in the form where the regenerative repeater is removed in the condition that the power supply is in the not-yet-turned-on state.

3 Claims, 6 Drawing Sheets

REGENERATIVE REPEATER

BACKGROUND OF THE INVENTION

The present invention relates to a regenerative repeater for regenerating an attenuated digital signal and repeating it in a token ring LAN or the like and, more particularly, relates to a regenerative repeater in which a system operation is secured even when there is a cut-off or failure of a power supply.

Heretofore, the token ring LAN has been provided for as an 802.5 standard by the 802 committee of IEEE (Institute of Electrical and Electronics Engineers, Inc.). The token ring LAN is capable of ring-like connecting a maximum number, 250, of stations by use of trunk coupling units (TCUs).

Figure 5:
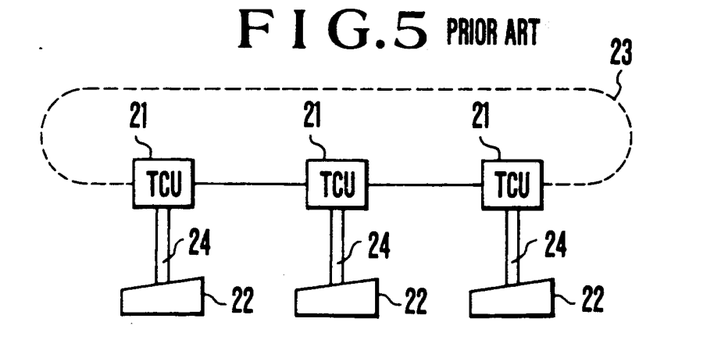
FIG. 5 provides a diagram showing the basic configuration of an IEEE 802.5 token ring LAN using TCUs.

Referring to FIG. 5, there is shown the basic configuration of the IEEE 802.5 token ring LAN using TCUs. In FIG. 5, TCUs 21 are annularly connected through a main ring 23. Stations 22 are connected correspondingly respectively to the TCUs 21 through spurs 24. Accordingly, it is necessary to provide the TCUs 21 equal in number to the stations 22 connected thereto.

Figure 6A:
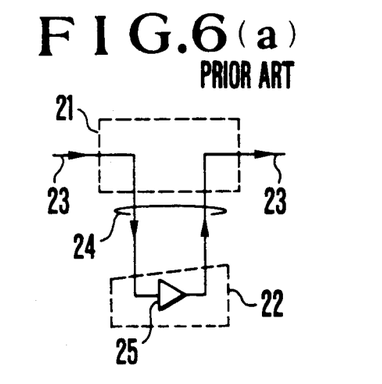
FIGS. 6(a) and 6(b) provide diagrams showing the flow of the signal in FIG. 5.
Figure 6B:
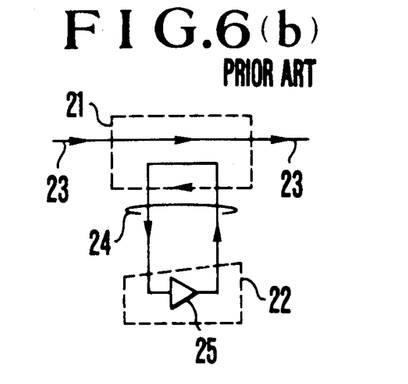

FIGS. 6(a) and 6(b) show flows of a signal in one TCU 21 and one station 22 connected thereto as shown in FIG. 5. FIG. 6(a) illustrates a state in which the station 22 is connected to the main ring 23 (hereinafter referred to as "insert state"). In this insert state, the signal flows along the arrows in the course of the main ring 23→TCU 21→the spur 24→the station 22→the spur 24→the TCU 21→the main ring 23. Because the signal passes through the inside of the station 22, the station 22 can perform reception of data from the signal or transmission of data onto the signal as occasion demands. Because the station 22 is inserted into the ring in series, the station 22 serves also as a regeneratively repeating function to regenerate the signal coming from the upstream side and repeat it to the downstream side. The reference numeral 25 designates a regenerative repeater having this function. FIG. 6(b) shows a state in which the station 22 is not connected to the main ring 23 (hereinafter referred to as "bypass state"). In this state, the signal flows in the course of the main ring 23→the TCU 21→the main ring 23 so that the signal does not pass through the inside of the station 22.

The two states of the TCU 21, that is, the insert and bypass states shown respectively in FIGS. 6(a) and 6(b), are controlled by the station 22. In other words, the station 22 causes a direct current to flow to the TCU 21 through the spur cable 24 to operate a relay in the TCU 21 to thereby control the two states shown in FIGS. 6(a) and 6(b). Thus, the insert state is selected in the case where an electric source for the station 22 is in its on-state. On the other hand, the bypass state is selected in the case where the electric source for the station 22 is in its off-state. Therefore, when the electric source for the station 22 is in the off-state, regenerative repeating is not carried out, so that the ring is kept normal because there occurs no phenomenon of disconnection of the ring. Since the control of the insert and bypass states is stated in detail in the IEEE 802.5 standard and is not concerned directly with the present invention, the detailed description thereof will be omitted here.

In the following, a typical system configuration of the IEEE 802.5 token ring LAN using the foregoing TCUs is described.

Figure 7A:
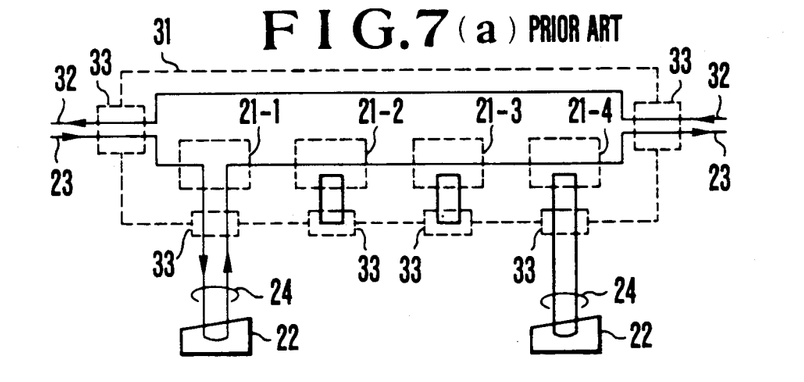
FIGS. 7(a) and 7(b) provide diagrams showing the configuration of a line concentrator.
Figure 8A:
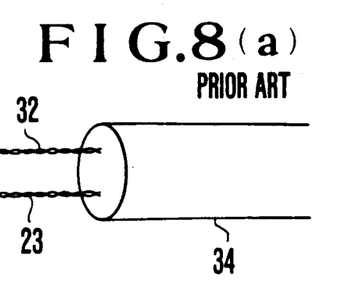
FIGS. 8(a) and 8(b) provide diagrams showing the configuration of a cable.
Figure 8B:
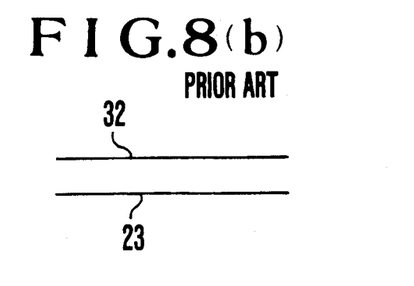

In general, a plurality of TCUs, not singly, are incorporated in an apparatus called "a line concentrator". FIG. 7(a) shows an example of the line concentrator, in which four TCUs are incorporated. The reference numeral 23 designates a main ring, and 32 designates a stand-by ring. The two rings 23 and 32 are contained in one cable and connected to the line concentrator 31 through medium interface connectors (MICs) 33. As shown in FIG. 8(a), two pairs of twisted wires are contained in one cable, each pair forming one line (the main ring 23 or the stand-by ring 32). The lines (the main ring 23 and the stand-by ring 32) will be illustrated in a simplified manner as shown in FIG. 8(b).

Figure 7B:
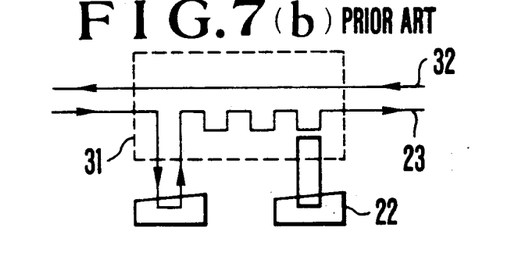

Referring to FIG. 7(a) again, in the line concentrator 31, the main ring 23 is connected to the TCUs 21-1 to 21-4 successively. On the contrary, the stand-by ring 32 is not connected to the TCU's anywhere in the line concentrator 31. The stand-by ring 32 and the main ring 23 are collected, so as to be connected to another cable, through another MIC 33. On the other hand, each spur 24 is constituted by two lines being contained in one cable and being used for signal transmission forward and backward. Each spur 24 is connected to the line concentrator 31 through an MIC 33 so as to be connected to the corresponding TCU 21. In the case of FIG. 7(a), the TCU 21-1 is in the insert state in which connection control from the station 22 is carried out, each of the TCUs 21-2 and 21-3 is in the state where no station is connected thereto, and the TCU 21-4 is in the bypass state in which connection control from the station 22 is not carried out though the station is connected. FIG. 7(b) shows the state of that shown in FIG. 7(a) in a simplified manner. Hereinafter, the line concentrator 31 will be illustrated in a simplified manner as shown in FIG. 7(b).

Figure 9A:
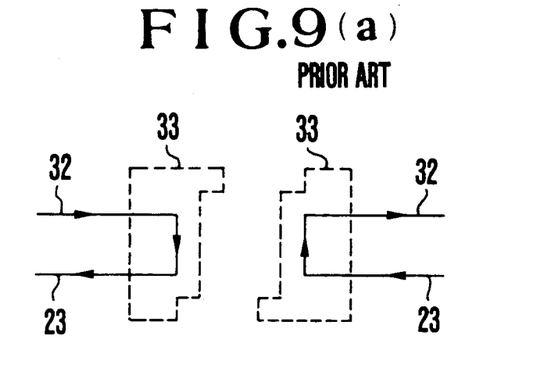
FIGS. 9(a) to 9(d) provide diagrams showing the configuration of a MIC.
Figure 9B:
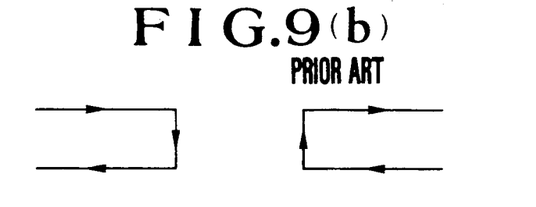
Figure 9C:
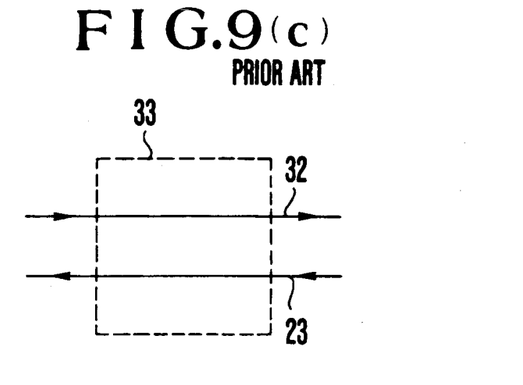
Figure 9D:
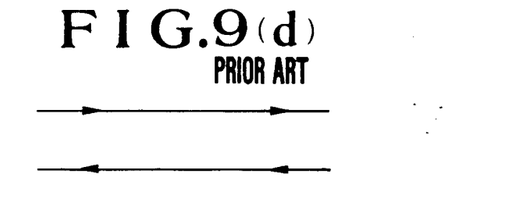

FIGS. 9(a)–9(d) each shows connection of lines in the inside of the MIC 33 as provided for in the IEEE 802.5. In the case where the MIC 33 is in a disconnected state as shown in FIG. 9(a), a loop-back state from one line to the other is established. In the case where the MIC 33 is in a connected state as shown in FIG. 9(c), the loop-back state is canceled. For the simplification's sake, the respective states of FIGS. 9(a) and 9(c) are illustrated hereinafter in the manners as shown in FIGS. 9(b) and 9(d), respectively.

Figure 10A:
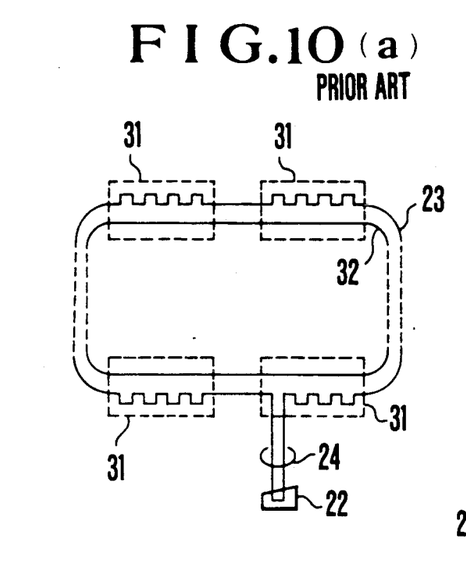
FIGS. 10(a) and 10(b) provide diagrams showing an example of the configuration a system using line concentrators.
Figure 10B:
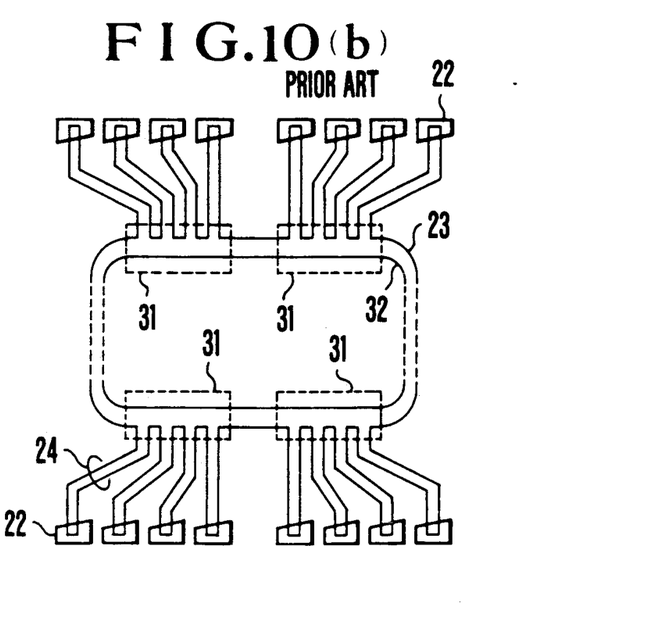

FIGS. 10(a) and 10(b) show examples of a system configuration using the line concentrators as shown in FIGS. 7(a) and 7(b). In FIGS. 10(a) and 10(b), the line concentrators 31 are connected annularly through the cable containing the main ring 23 and the stand-by ring 32. FIG. 10(a) shows a case where only one station 22 is connected to the ring. FIG. 10(b) shows a case where a plurality of stations 22 are respectively correspondingly connected to all the TCUs in the ring. Now, let the maximum number of the stations be 250. Because control as to whether each station is to be connected to the ring or not is carried out by the station 22 per se, the number of stations in one system can take any value within a range of from 1 to 250. Accordingly, it is apparent that maximum-length transmission viewed from a certain station 22 is in the case where other stations 22 do not carry out regenerative repeating, that is, in the case where the number of stations is 1 as shown in FIG. 10(a).

Figure 11A:
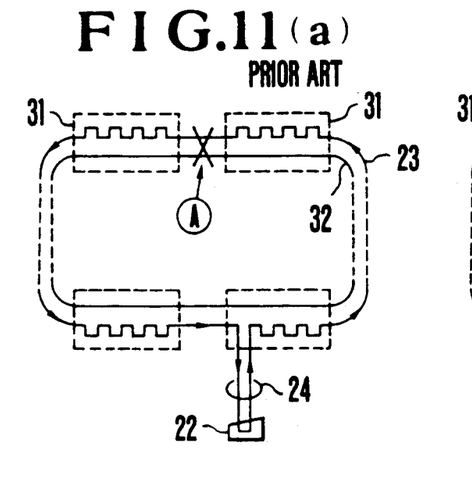
FIGS. 11(a), 11(b), 12(a), 12(b), 13(a) and 13(b) provide diagrams showing examples of reconstruction in case of a ring failure.
Figure 11B:
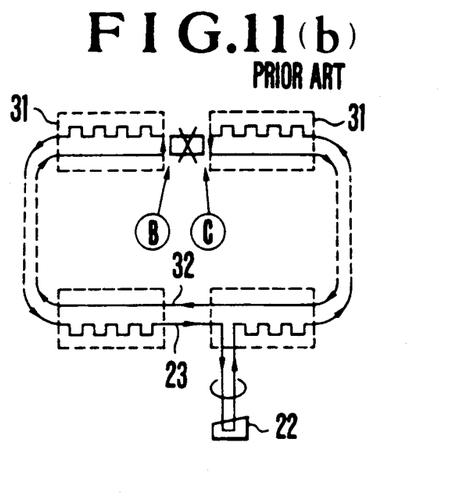

In the following, the case where a failure occurs in the ring is described. FIG. 11(a) is a diagram showing the case where a failure occurs in a cable, that is, a disconnection fault occurs at a point A of the cable. In this case, the cable in which the disconnection fault has occurred is cut off from the system as a countermeasure. FIG. 11(b) shows a state where the cable having the disconnection fault has been cut off. The cut off of the cable portion having the disconnection fault may be carried out by disconnecting the MICs 33 respectively connecting the adjacent line concentrators 31 to the cable portion having the disconnection fault. When the MICs 33 have been disconnected, the loop back state as shown in FIG. 9(a) is established in each of the MICs 33, that is, the loop back state is formed at each of points B and C shown in FIG. 11(b). Accordingly, a signal transmitted from the station 22 passes through the main ring 23 to the point C, loops back to the stand-by ring 32 and then loops back to the main ring 23 again at the point B, so that the signal can be returned to the station 22. Accordingly, the operation of the system can be secured.

Figure 12A:
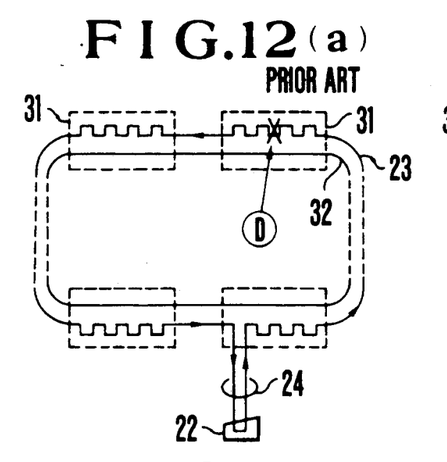
Figure 12B:
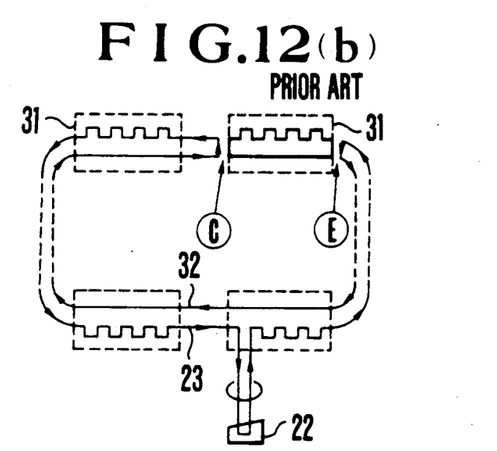

FIG. 12(a) shows a case where a failure has occurred at a point D in the line concentrator 31. In this case, the line concentrator 31 in which the failure has occurred is cut off from the system as the countermeasure. FIG. 12(b) shows a state where the countermeasure has been taken. Because the cable is cut off by disconnecting the MICs 33 at the opposite ends of the line concentrator 31 having the failure, the loop back state is established at each of points C and E so that the ring is reconstructed.

The maximum transmission distance of a system is not provided for in the IEEE 802.5, and it is affected by the characteristics of elements such as the attenuation quantity of the cable, the capacity of the transmitter and receiver, and the like. Accordingly, the maximum transmission distance of a system varies depending on the system, so that it cannot be decided uniformly. It is however said that the maximum transmission distance in a typical system is about 800 m, and this value is used herein for the convenience's sake.

As described above, the number of the stations in a system falls within a range of from 1 to 250 and changes dynamically during the operation of the system. In view of the transmission distance, the condition becomes worst when the station number is 1. In order to perform a normal operation within the maximum transmission distance even at the time of looping back after the measure counter to the failure has been taken as shown in FIG. 12(b), it is necessary that the following expression (1) is satisfied.

$$(\text{Main ring length}) + (\text{Standby ring length}) + (\text{Spur length}) \times 2 \leq 800 \text{ m} \quad (1)$$

In the expression (1), the spur length is doubled because the signal moves back and forth in the spur 24.

In practical use, the main ring 23 and the stand-by ring 32 are contained in one and the same cable. Further, the spur 24 is contained in one cable. Accordingly, the cable length is represented by the following expression (2).

$$[(\text{Ring cable length}) + (\text{Spur cable length})] \times 2 \leq 800 \text{ m} \quad (2)$$

Accordingly, when the system is designed, the ring cable length and the spur cable length must be assigned to determine the cable length to 800 m/2=400 m. For the simplification's sake of discussion, it is now assumed that the ring cable length and the spur length are 300 m and 100 m, respectively.

Figure 13A:
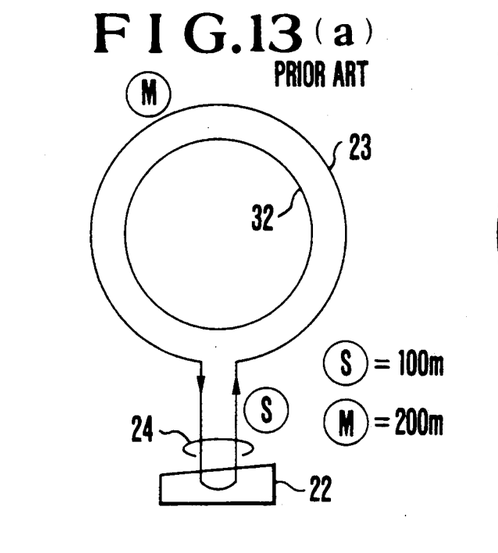
Figure 13B:
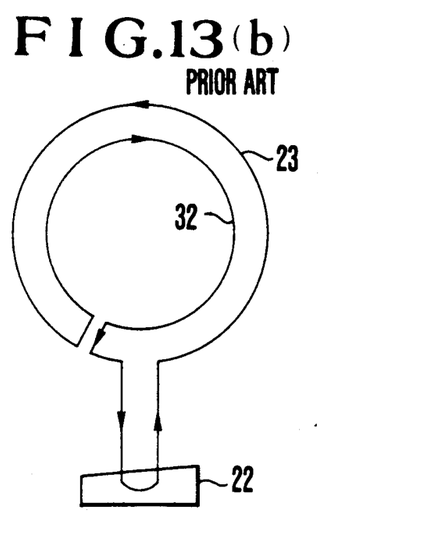

FIG. 13(a) is a simplified illustration of the system configuration depicted in FIGS. 10(a) and 10(b). The line concentrators in the diagrams of FIGS. 10(a) and 10(b) are not shown in FIG. 13(a). In FIG. 13(a), the transmission distance is 100 m+300 m+100 m=500 m because the spur cable and the ring cable are 100 m and 300 m long respectively. FIG. 13(b) shows a system configuration in a case where a failure arises. In FIG. 13(b), the stand-by ring 32 for looping back is used, so that the transmission distance is 100 m+300 m+300 m+100 m=800 m which is just equal to the maximum transmission distance.

Although an example of the typical system configuration on the IEEE 802.5 token ring LAN has been described above, there arises a problem in that the ring cannot be enlarged. In short, the ring cable length is limited to 400 m even though the spur length is minimized. Accordingly, the LAN cannot be used in a place where the ring cable length is required to be larger than 400 m. To solve this problem and to enlarge the ring cable, a regenerative repeater is introduced. The regenerative repeater has a so-called regeneratively repeating function to amplify the incoming signal from the upstream side after passed through the cable, regenerate it while correcting distortion and repeat it to the downstream side.

Figure 14:
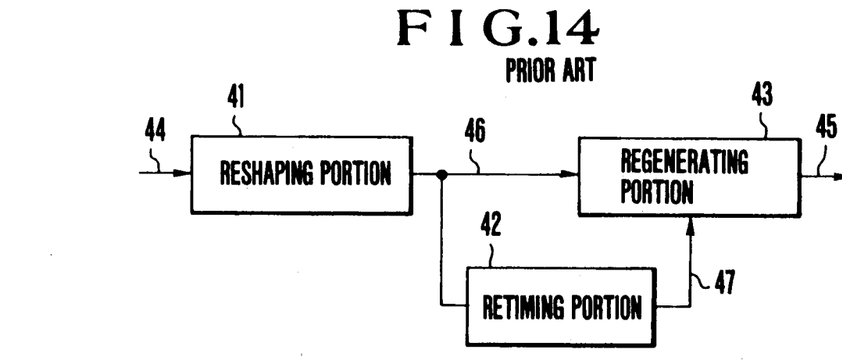
FIG. 14 provides a diagram showing a basic configuration of a conventional regenerative repeater.

FIG. 14 shows a basic configuration of a regenerative repeater having so-called 3R functions of reshaping, retiming and regenerating. For example, Japanese Patent Unexamined Publication (J-P-A) No. 56-89156 is relevant to such a regenerative repeater of this type.

In FIG. 14, a reshaping portion 41 is a so-called equalizer for performing correction of distortion and recovery of amplitude of the signal which is distorted and reduced in amplitude during transmission through the cable. With respect to correction of distortion of the signal, an equalizer having a characteristic reverse to the attenuation characteristic of the cable. In the IEEE 802.5, a fixed equalizing system in which the characteristic of the equalizer is fixed is typically used. For example, the equalizer characteristic capable of correcting the characteristic of cable of 0 to 800 m is used. A signal 44 from the upstream side is fed to the reshaping portion 41 in which both the correction of distortion and the recovery of amplitude are carried out. Then, a reshaping output 46 is fed to a retiming portion 42 in which a timing signal 47 is produced in synchronism with the reshaping output 46. On the other hand, the reshaping output 46 is fed also to a regenerating portion 43 in which the reshaping output 46 is sampled on the basis of the timing signal 47 so as to produce a regenerative output 45. The regenerative output 45 is fed to the downstream side to finish regenerative repeating.

By use of the aforementioned regenerative repeater, it is possible to correct the characteristic of cable up to 800 m upstream from the regenerative repeater, and it is therefore possible to enlarge the transmission distance.

In the following, the case where this type regenerative repeater is applied to the IEEE 802.5 token ring LAN is discussed.

Figure 15:
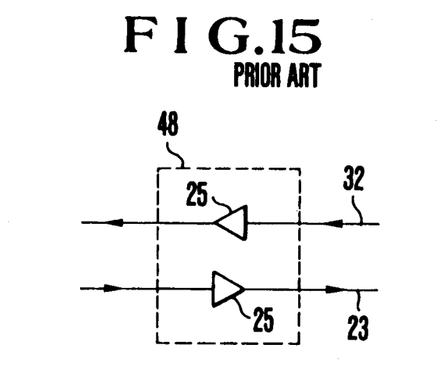
FIG. 15 provides a schematic diagram of a conventional regenerative repeater.

FIG. 15 shows an example of a conventional regenerative repeater for use for the IEEE 802.5. In FIG. 15, the regenerative repeater 48 has two regenerative repeater elements 25 for a main ring 23 and for a stand-by ring 32 respectively. The two regenerative repeater elements 25 are equal in configuration.

Figures 16A, 16B:
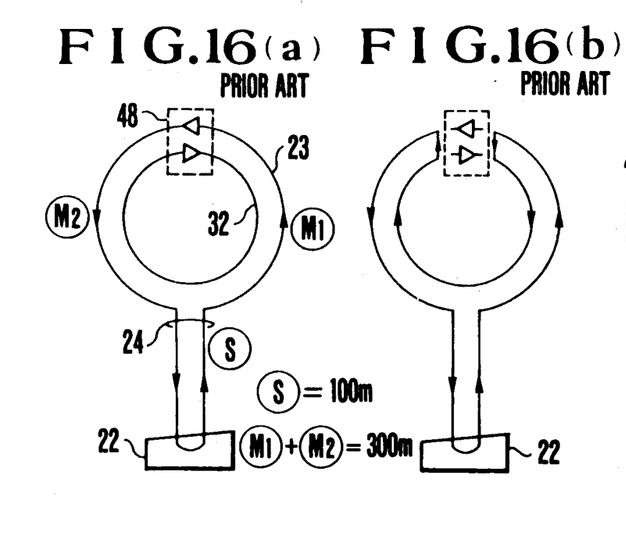
FIGS. 16(a), 16(b) and 17(a) to 17(c) provide diagrams showing examples of the configuration of a system using the conventional regenerative repeater.

FIGS. 16(a) and 16(b) show a case where the regenerative repeater 48 is inserted into the ring. In FIG. 16(a), the spur length of a portion S is 100 m, and the total ring length of the portions $M_1$ and $M_2$ is 300 m. The case shown in FIG. 16(a) is similar to the case of FIGS. 13(a) and 13(b) where the regenerative repeater 48 is not inserted. Accordingly, there is no effect obtained by insertion of the regenerative repeater 48. The reason that there is no effect, is described with reference to FIG. 16(b). FIG. 16(b) shows a case where a problem has occurred to make the regenerative repeater function of the regenerative repeater 48 inoperative because of a power failure or any other cause, and as a counter-measure, the regenerative repeater has been disconnected from the ring. In this condition, the transmission distance viewed from the station 22 is similar to that in the case shown in FIG. 13(b), that is, 800 m. Accordingly, in the case where only one regenerative repeater 48 is inserted into the ring, the cable length is as shown in FIG. 16(a). In this case, there is an idea that a countermeasure of, for example, doubling the electric source and the circuit, must be provided to secure regenerative repeating regardless of such a failure, because the regenerative repeater is inserted into the ring in series. This idea is a general one for the regenerative repeater. According to this thought, it is possible to double the ring cable length. However, this idea has problems in that looping back by an MIC is impossible (because the transmission distance exceeds 800 m), the doubling causes an increase in cost, and the like. Consequently, this idea has not been employed.

It is apparent from the above description that there is no effect owing to the enlargement of the cable length in the token ring LAN in the case where only one regenerative repeater is inserted into the ring. In the following, the case where two regenerative repeaters are inserted into the ring is discussed.

Figures 17A, 17B, 17C:
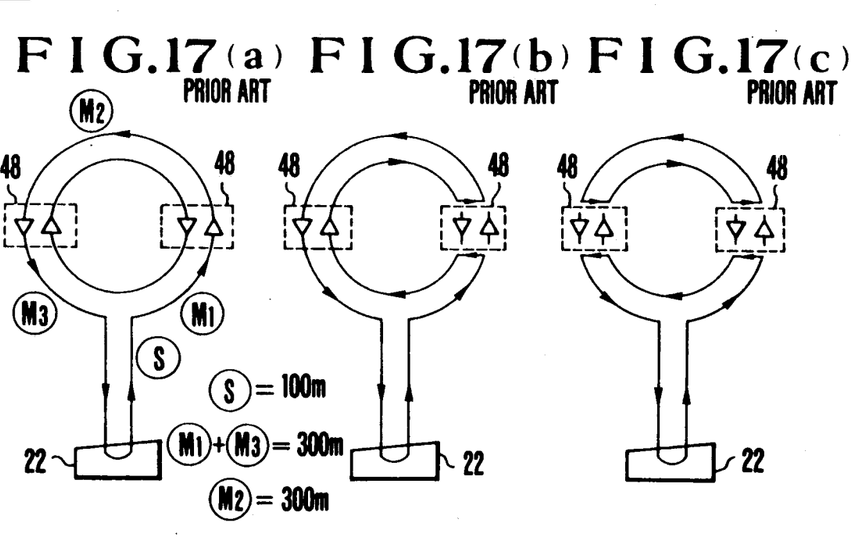

FIGS. 17(a)-17(c) show a case where two regenerative repeaters 48 are inserted into the ring. In FIG. 17(a), the spur length of the portion S is 100 m, the sum of the ring cable length of the portions $M_1$ and $M_3$ is 300 m, and the ring cable length of the portion $M_2$ is 300 m (in the case where the station is inserted, the transmission distance inclusive of the spur length of 100 m is 400 m). FIG. 17(b) shows a state where a failure has occurred in one of the two regenerative repeaters 48 and the failure regenerative repeater has been disconnected from the ring so that the ring is in a loop back state. Transmission distances between the regenerative repeaters are: (spur S)+(portion $M_1$)+(portion $M_1$)+(portion $M_3$)<800 m (from the station 22→the failure regenerative repeater 48→the normal regenerative repeater 48); (portion $M_2$)×2=600 m<800 m (the normal regenerative repeater 48→the failure regenerative repeater 48→the normal regenerative repeater 48); and (portion $M_3$)+(spur S)<800 m (the normal regenerative repeater 48→the station 22). All of the transmission distances are not longer than the maximum transmission length of 800 m. Accordingly, reconstruction of the ring against the failure has been performed as a measure to counter the failure. FIG. 17(c) shows a case where the two regenerative repeaters 48 have had failures at the same time and have been disconnected from the ring. In this case, because the ring is separated into two ring portions, one for the portions S, $M_1$ and $M_3$ and the other for the portion $M_2$, reconstruction has been made though the ring viewed from the station 22 has been degraded. There is accordingly no problem in signal transmission because the transmission distances at the two ring portions are 800 m and 600 m, respectively. The rule applies to the case where three or more regenerative repeaters are inserted into the ring. In this case, the ring length can be enlarged by 300 m per one additional regenerative repeater.

As described above, the introduction of regenerative repeaters make it possible to enlarge the ring length of the IEEE 802.5 token ring LAN, and, further, make it possible to perform reconstruction of the ring by disconnecting a failure factor from the ring even in the case where a failure occurs in constituent members of the ring, such as line concentrators, cables, regenerative repeaters and the like, in a typical system configuration.

In the prior art technique, however, there has been a problem in that plenty of time is required for determination and disconnection of a failure portion in order to perform ring reconstruction when a failure occurs in the token ring LAN, because the failure portion must be disconnected manually or by human hand. In particular, even except for everlasting failures in the line concentrators, cables, regenerative repeaters or the like, there has been a problem in that the system may be made inoperative because of interruption of the regenerative repeater function which may be caused even by factors such as erroneous leaving of a regenerative repeater power supply in a not-yet-turned-on state, turning off of the power supply by erroneous operation, or the like, which cannot be called failures.

SUMMARY OF THE INVENTION

An object of the present invention is to provide a regenerative repeater for realizing a stable system in which the number of steps requiring human hand in case of a failure can be decreased and the possibility of shutdown of the system due to factors other than failures can be reduced.

To attain the foregoing object, the present invention provides a regenerative repeater provided therein with loop back circuits which operate to automatically form return paths to thereby lead a main ring to a stand-by ring without passing through regenerative repeater elements when an electric source is not supplied.

The loop back circuits in the regenerative repeater operate to insert the regenerative repeater elements into the ring in series, when the electric source is in an off-state. On the other hand, when the electric source is in a not-yet-turned-on state, the loop back circuits operate to form return paths from the main ring to the stand-by ring not through the regenerative repeater elements. Accordingly, even in the condition where the regenerative repeater elements are an inoperative state because the electric source is not supplied due to a trouble in the electric source, a not-yet-turned-on state of the electric source, or a mal-operation of the electric source, etc., the ring-like line can be reconstructed in the regenerative repeater to secure the operation of the system.

DESCRIPTION OF THE PREFERRED EMBODIMENTS

An embodiment of the present invention will be described hereunder with reference to the drawings.

Figure 1A:
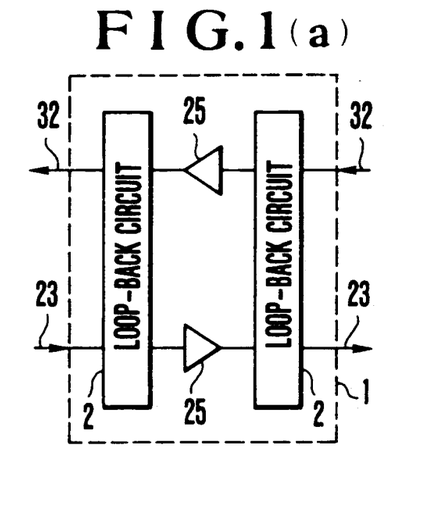
FIGS. 1(a) to 1(c) provide diagrams showing the basic configuration of a regenerative repeater according to the present invention.
Figure 1B:
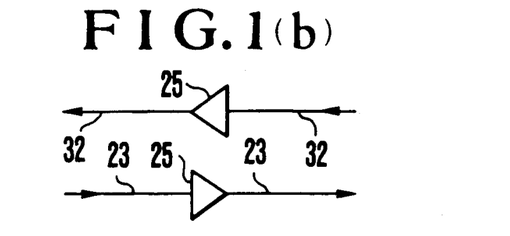
Figure 1C:
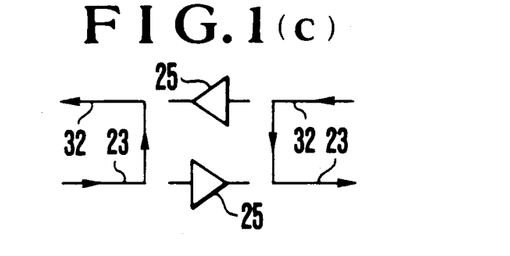

Referring to FIG. 1(a), there is shown the basic configuration of a regenerative repeater 1 according to the present invention. The regenerative repeater 1 is provided with a pair of regenerative repeater elements 25 for a main ring 23 and for a stand-by ring 32 respectively, and a pair of loop back circuits 2 for performing looping-back for the main ring 23 and for the stand-by ring 32 respectively. Each of the regenerative repeater elements 25 has functions of reshaping, retiming, regenerating and the like. FIG. 1(b) shows a state where the electric source is in an on-state. In this state, the pair of regenerative repeating elements 25 are connected to the main ring 23 and the stand-by ring 32, respectively. FIG. 1(c) shows a state where the electric source is in a not-yet-turned-on state. In this state, the pair of loop back circuits 2 operate automatically so as to form looping-back without containing the pair of regenerative repeating elements 25.

Figure 2A:
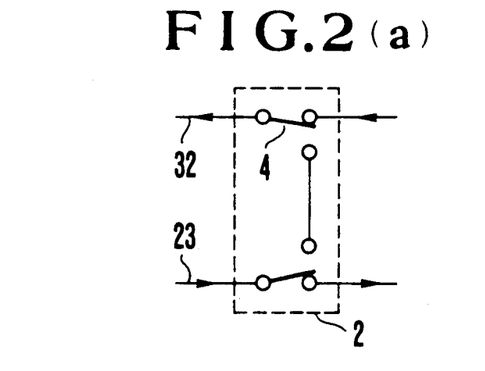
FIGS. 2(a) and 2(b) provide diagrams showing the detailed operation of the loop back circuit of FIGS. 1(a) to 1(c)
Figure 2B:
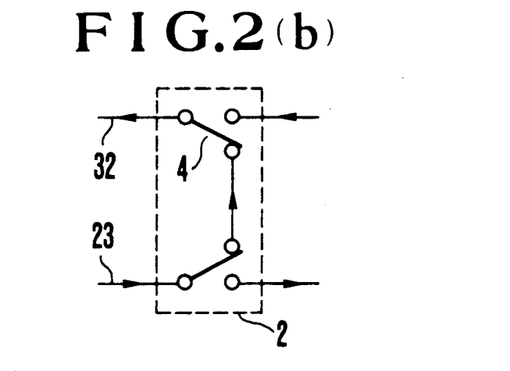

The detailed operation of the loop back circuit 2 depicted in FIGS. 1(a) to 1(c) is shown in FIGS. 2(a) and 2(b). In FIGS. 2(a) and 2(b), the reference numeral 4 designates transfer relay contacts. FIG. 2(a) shows the state where the electric source is in the on-state. In this state, the relay contacts 4 are operated so that paths are formed to connect the regenerative repeating elements to the ring.

FIG. 2(b) shows a case where the electric source is in an off-state. In this state, the relay contacts 4 are not operated so that a loop-back path from the main ring 23 to the stand-by ring 32 is formed.

Figure 3A:
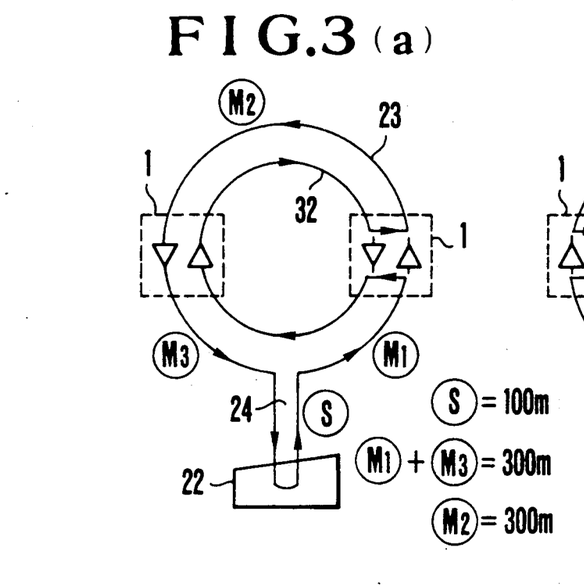
FIGS. 3(a) and 3(b) provide diagrams showing an example of the configuration of a system using the regenerative repeater of FIGS. 1(a) to 1(c)
Figure 3B:
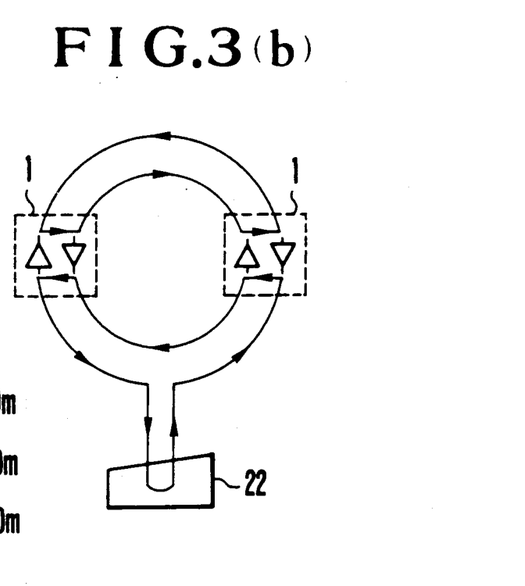

FIGS. 3(a) and 3(b) show an example of the system configuration using the regenerative repeaters 1 according to the present invention. In this example, the cable length is the same as that in FIG. 17(a). FIG. 3(a) shows a state where the electric supply for one regenerative repeater 1 is in a not-yet-turned-on state because of a problem, a mal-operation, or the like. In this state, looping back is carried out in the inside of the regenerative repeater 1, so that the same configuration as in FIG. 17(b) can be provided without performing conventional manual operation for disconnecting the MICs. Similarly, the same configuration as in FIG. 17(c) can be provided in the state shown in FIG. 3(b) in which the power supply for each of the two regenerative repeaters 1 is in a not-yet-turned-on state because of a trouble, a mal-operation, or the like.

Figure 4A:
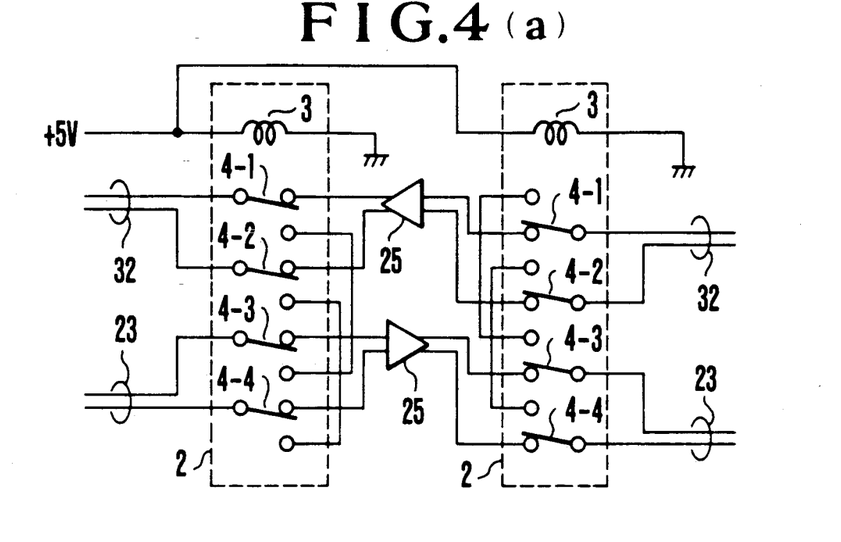
FIGS. 4(a) and 4(b) provide diagrams showing the specific configuration of an embodiment the regenerative repeater according to the present invention.
Figure 4B:
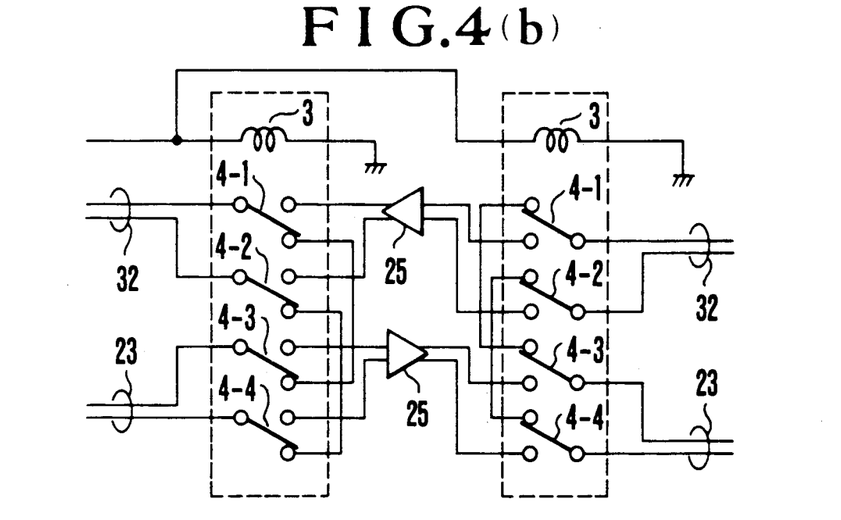

FIGS. 4(a) and 4(b) show a specific example of the circuit configuration of the regenerative repeater according to the present invention. In FIGS. 4(a) and 4(b), each of the loop back circuits 2 is constituted by a four-contact transfer relay.

FIG. 4(a) shows a state where the electric source (+5 V) is in the on-state. In this state, an electric current flows in coils 3 of the respective four-contact transfer relays, so that the four contacts 4-1 to 4-4 of each respective transfer relay are operated so as to connect the regenerative repeating elements 25 to the main ring 23 and the stand-by ring 32, respectively. FIG. 4(b) shows a state where the electric source is in a not-yet-turned-on state. In this state, no electric current flows in the coils 3 and the contacts are not operated so that return paths from the main ring 23 to the stand-by ring 32 and from the stand-by ring 32 to the main ring 23 are formed not through the respective regenerative repeating elements 25.

As described above, according to the present invention, since loop-back paths are automatically formed when the electric source is not supplied for the regenerative repeater, it is not necessary to manually perform the reconstruction of the token ring LAN and the like in case of existence of a problem in power source, and it is possible to reduce the possibility of shutdown of the system due to factors, such as erroneous leaving of a regenerative repeater power supply in a not-yet-turned-on state, turning off of the power supply by erroneous operation, or the like, which cannot be called failures. It is a matter of course that the regenerative repeater according to the present invention can be applied to network systems other than the token ring LAN.

We claim:

1. A network system comprising transmission line means, a regenerative repeater inserted in said transmission line means for regenerating and repeating a signal to be transmitted, and loop back circuit means inserted in said transmission line upstream of said repeater whereby when a power supply to said regenerative repeater is not established, said circuit means isolates said transmission line means from said regenerative repeater and establishes a continuous loop of said transmission line means upstream of said repeater.

2. A regenerative repeater comprising:
   first regenerative repeater means for regeneratively repeating a signal on a first line in a first direction;
   second regenerative repeater means for regeneratively repeating a signal on a second line in a second direction opposite to said first direction; and
   loop back means operatively connected to said first and second lines for automatically separating said first and second regenerative repeater means from said first and second lines respectively so as to establish a loop back connection of said first line in said first direction with said second line in said second direction and establish a loop back connection of said second line in said second direction with said first line in said first direction when power is not established to said repeater.

3. A regenerative repeater according to claim 2, in which said loop back means is constituted by four-contact transfer relay means.

* * * * *